US010567176B2

(12) United States Patent
Auffray (10) Patent No.: US 10,567,176 B2
(45) Date of Patent: Feb. 18, 2020

(54) METHOD FOR LOADING A COMPUTER RESOURCE INTO AN ELECTRONIC DEVICE, CORRESPONDING ELECTRONIC MODULE AND COMPUTER PROGRAM

(71) Applicant: INGENICO GROUP, Paris (FR)

(72) Inventor: Christophe Auffray, Rueil Malmaison (FR)

(73) Assignee: INGENICO GROUP, Paris (FR)

( * ) Notice: Subject to any disclaimer, the term of this patent is extended or adjusted under 35 U.S.C. 154(b) by 57 days.

(21) Appl. No.: 15/371,558

(22) Filed: Dec. 7, 2016

(65) Prior Publication Data

US 2017/0163428 A1 Jun. 8, 2017

(30) Foreign Application Priority Data

Dec. 7, 2015 (FR) ...................................... 15 61948

(51) Int. Cl.
*G06F 21/51* (2013.01)
*H04L 9/32* (2006.01)

(52) U.S. Cl.
CPC ............ *H04L 9/3263* (2013.01); *G06F 21/51* (2013.01); *H04L 9/3247* (2013.01)

(58) Field of Classification Search
CPC .. G06F 21/50–51; G06F 21/56; G06F 21/572; G06F 21/575; G06F 21/64; G06F 21/74; G06F 2221/2109; G06F 9/4401; H04L 9/3263; H04L 9/3247
See application file for complete search history.

(56) References Cited

U.S. PATENT DOCUMENTS

| 6,149,522 A * | 11/2000 | Alcorn ................. G06F 21/64 380/251 |
| 7,203,841 B2 * | 4/2007 | Jackson ................. G06F 21/64 713/187 |
| 8,250,372 B1 * | 8/2012 | Muir .................... G06F 9/4401 713/187 |

(Continued)

OTHER PUBLICATIONS

Hennessy et al., Computer Organization and Design, 1998, Morgan Kaufmann, Second Edition, pp. 644-654.*

(Continued)

*Primary Examiner* — Minh Dinh
(74) *Attorney, Agent, or Firm* — David D. Brush; Westman, Champlin & Koehler, P.A.

(57) ABSTRACT

A method for loading an information-processing resource by a device having a processor and a random-access memory having the steps of: obtaining at least one address corresponding to at least one block of data within which the resource is at least partially recorded; and for said at least one previously obtained current address: loading a current block of data as a function of said current address; obtaining at least one reference certificate of the current block of data; obtaining at least one current certificate of the current block of data, said reference and current certificates being encrypted digital signatures of said current data block; issuing an assertion of validity as a function of said reference and current certificates when said reference and current certificates are identical; copying said current data block into the random-access memory, when said assertion of validity is positive.

5 Claims, 3 Drawing Sheets

(56) References Cited

U.S. PATENT DOCUMENTS

| | | | |
|---|---|---|---|
| 9,762,399 B2 * | 9/2017 | Ghose | H04L 9/3247 |
| 9,779,033 B2 * | 10/2017 | Hashimoto | G06F 12/1416 |
| 2012/0331303 A1 | 12/2012 | Andersson et al. | |

OTHER PUBLICATIONS

Computer Dictionary, 2002, Microsoft, Fifth Edition, pp. 317.*
Schneier, Applied Cryptography, 1996, John Wiley & Sons, Second Edition, pp. 34-41.*
Preliminary Search Report with regard to FR 1561948 dated Jul. 12, 2016.

* cited by examiner

METHOD FOR LOADING A COMPUTER RESOURCE INTO AN ELECTRONIC DEVICE, CORRESPONDING ELECTRONIC MODULE AND COMPUTER PROGRAM

1. CROSS-REFERENCE

The present application claims priority to French Patent Application No. 1561948, filed Dec. 7, 2015, the entirety of which is incorporated herein by reference.

2. FIELD OF THE TECHNOLOGY

The present invention relates to the management of the loading and execution of software applications on a terminal. More particularly, the present technique relates to the acceleration of the loading of secured applications for a terminal processor which can itself be secured. The invention is aimed at enabling a faster loading of applications into a memory. The invention also relates more specifically to the loading of applications into a terminal such as for example a payment terminal which has relatively limited processing capacities.

3. PRIOR ART

Electronic terminals such as smartphones, digital (touch-pad) tablets or payment terminals often embed applications, some of which can be sensitive applications (such as applications enabling identification, authentication or again payment). This type of application is generally recorded within a "flash" type memory, for example in encrypted form. This is common and is due to the nature of the applications concerned. It may be recalled that a "flash" memory is a rewritable semiconductor-based mass memory. It is therefore a memory that has certain characteristics of a random-access memory but the data of which are persistent, even when the device is powered off. A flash memory thus stores data bits in memory cells and the data are preserved in a memory when the electrical supply of the memory is cut off.

A "flash" memory within which applications can be recorded can itself be a secured memory: thus, such a memory can have physical protection mechanisms which enable the detection of a possible attempt at intrusion (such as, for example, the positioning of probes for snooping on signals travelling through the electronic component). The result of this is that the memory in question (i.e. the electronic component itself) often has a relatively reduced bandwidth. This means for example that the loading times are relatively lengthy: on the one hand, the component can be slow in itself and on the other hand the process of verifying the integrity of the loaded data slows down the loading operation.

Besides, the problem that has just been described for an application can also exist for operating systems of the terminal as a whole. Thus, for example, all the executable files of a Linux system (of the Android™ type) are loaded in their entirety into a random-access memory when this system is booted. This means that, when there are relatively inexpensive memory components available, the loading and the booting of the system are very lengthy and this is the case even without taking account of the processes for checking the integrity of the system.

When a process for checking the integrity of the data of the system is implemented, the authenticity of the executables is verified before they are loaded into a random-access memory. This verification is applied to the totality of the executable and its data, and this further slows down the booting of the apparatus.

It is therefore necessary to have a system for loading applications or data (generally known as "resources") into a memory in which the totality of the resources do not need to be loaded into a memory in order to verify its authenticity.

4. SUMMARY

The invention does not entail these problems of the prior art. More particularly, the invention provides a simple solution to the problems identified here above. More particularly, the technique refers to a method for loading an information-processing resource by means of a device comprising a processor and a random-access memory, said loading being done into said random-access memory of said device from a mass memory, said resource being recorded in said mass memory by means of at least one block of data.

Said method comprises the following steps:
   obtaining at least one address corresponding to at least one block of data within which the resource is at least partially recorded;
   and for said at least one previously obtained current address:
   loading a current block of data as a function of said current address;
   obtaining at least one reference certificate of the current block of data;
   obtaining at least one current certificate of the current block of data;
   issuing an assertion of validity as a function of said reference certificate and of the current certificate.

Thus, the present technique makes it possible firstly to accelerate the loading of resources and secondly to limit energy expenditure by loading only resources needed at a given point in time.

According to one particular characteristic, when said assertion of validity is positive, said method comprises a step for copying said current block of data into the random-access memory of said device.

Thus, the loading and subsequent use of the resources are secured.

According to one particular characteristic, said step for obtaining said at least one address comprises:
   a step for intercepting a request for obtaining said resource;
   a step for determining said at least one address of said resource as a function of a list of resources.

Thus, the use of a mechanism of interception makes the implementing of the method of the present technique transparent for the calling application.

According to one particular characteristic, said list of resources is recorded into a secured memory of said device.

Thus, the access to the list of resources is made complicated and secures the loading process.

According to one particular characteristic, said step for obtaining a reference certificate of the current block of data comprises a step of searching for said reference certificate within a list of resources as a function of said current address.

Thus, the reference certificate is protected in the list of resources itself.

According to one particular characteristic, said step for obtaining at least one reference certificate of the current block of data comprises a step for extracting said reference certificate from the data of the current block of data, this data being loaded at said current address.

Thus, the reference certificate accompanies the block of data to be loaded and does not take up excessive space in the list of resources.

According to one particular characteristic, said step for obtaining at least one reference certificate of the current block of data comprises a step for loading said reference certificate from an address of said reference certificate, said address of said reference certificate being obtained from a list of resources, of which at least one input is associated with said current address and said address of said reference certificate.

Thus, to make a successful attack, a hacker must both succeed in replacing the block of data and succeed in locating and replacing the reference certificate attached to it.

According to another aspect, the present technique also relates to an electronic module for loading a computer resource into a device comprising a processor and a random-access memory, said loading being done within said random-access memory of said device from a mass memory, said resource being recorded on said mass memory by means of at least one block of data. According to the present technique, said module comprises means for:

- obtaining at least one address corresponding to at least one block of data within which the resource is at least partially recorded;
- loading a current block of data as a function of said current address;
- obtaining at least one reference certificate from the current block of data;
- obtaining at least one current certificate of the current block of data;
- issuing an assertion of validity as a function of said reference certificate.

According to a specific implementation, the different steps of the method according to the proposed technique are implemented by one or more software programs or computer programs comprising software instructions to be executed by a processor of an information processing device, such as a terminal, according to the invention, the programs being designed to control the execution of the different steps of the methods.

The invention is therefore aimed at providing a program capable of being executed by a computer or by a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form whatsoever.

The invention also seeks to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the invention can especially be uploaded to an Internet type network.

As an alternative, the information carrier can be an integrated circuit into which the program is incorporated, the circuit being adapted to executing or to being used in the execution of the method in question.

According to one embodiment, the invention is implemented through software and/or hardware components. In this respect, the term "module" can correspond in this document equally well to a software component as to a hardware component or again to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc.) and is capable of accessing the hardware resources of this physical entity (memories, recording media, communications buses, input/output electronic boards, user interfaces, etc.)

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the invention.

5. DRAWINGS

Other features and advantages shall appear more clearly from the following description of a preferred embodiment, given by way of a simple illustrative and non-exhaustive example and from the appended drawings, of which.

6. DESCRIPTION 6.1. Reminders of the Principle

It may be recalled that one of the problems to which the present technique seeks to provide a solution is related to the need to fully load the resources in order to verify the authenticity of these resources before they are used. The term "resources" in the present application refers as much to executable code data (i.e. applications) as to data used by this executable code (applications data).

Figure 1:
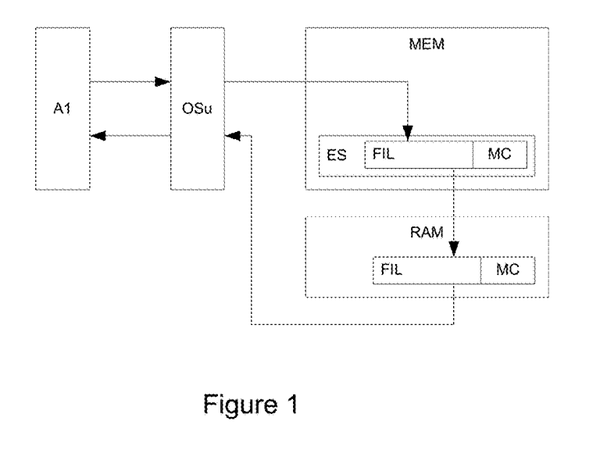
FIG. 1 presents an example of a problem posed.

For a better perception of the problems and issues resolved, a description is given with reference to FIG. 1 of a purely illustrative example to which the present technique can be applied.

Thus, it is assumed that an application A1 is executed on a processor (for example a secured processor) of a payment terminal. This application A1 seeks to access a cryptographic component (for example an encryption key) MC recorded within a physical memory MEM of the terminal. This cryptographic component MC itself forms part of a file FIL which is recorded within a specific space ES of the memory MEM. To be able to access the cryptographic component MC, the application A1 makes use of the operating system OSu (for example by means of an interruption mechanism) that loads the file FIL into a random-access memory RAM so that the application A1 can access it and extract the cryptographic component MC therefrom. The loading of the file FIL into the memory is preceded by the verification of authenticity of this file FIL. This verification of authenticity is done on the totality of the file FIL. Thus, for example, a cryptographic material (a component, a key), that would have a length of one megabyte and that is stored in a file comprising about 20 components of the same length requires the verification and loading of the entire file to enable access a single component. This results in a significant loss of time as well as an equally significant loss of energy (or loss leading to reduction of the general autonomy of the terminal).

This example makes it possible, in a simple way, to understand the set of problems to which the technique seeks to provide a solution. It is clear that real cases of implementation are relatively more complex.

Figure 2:
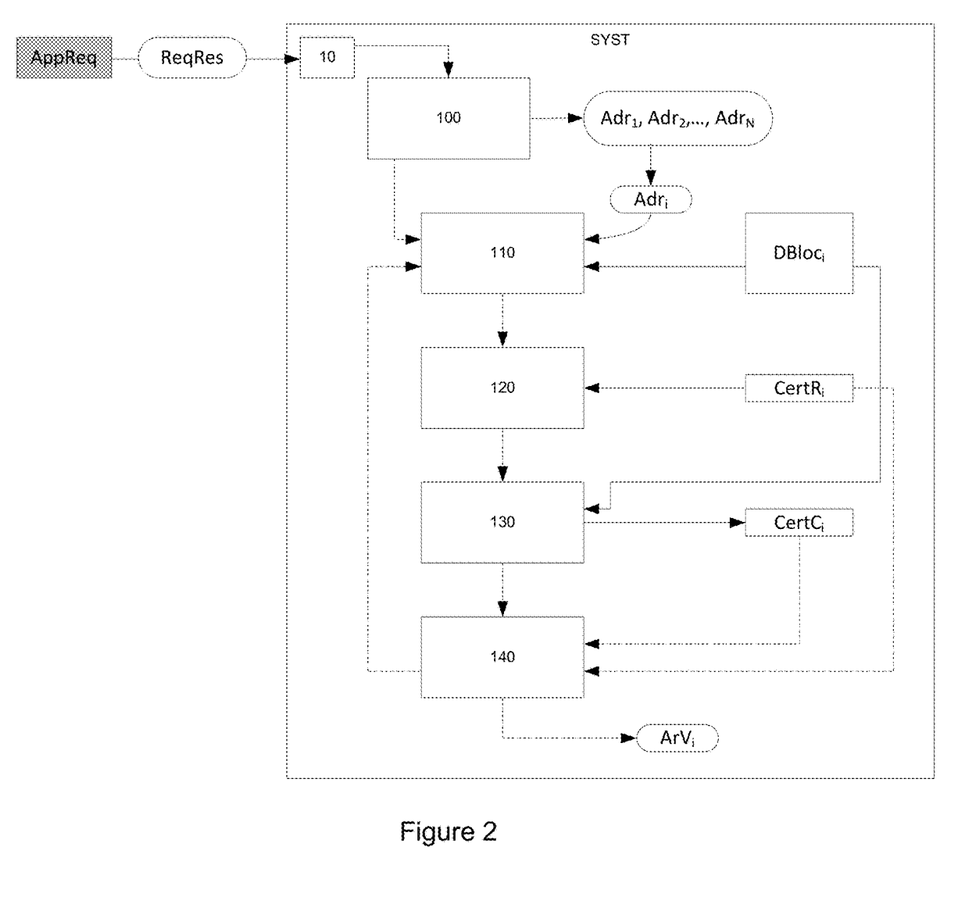
FIG. 2 is a block diagram of the proposed technique in which a reference certificate is compared with a current certificate to determine the validity of a block of data charged dynamically during the reception of a request for obtaining a resource.

The proposed technique resolves the above-mentioned problems or at least greatly limits the time needed for loading data, the authenticity of which has to be verified. The technique is described with reference to FIG. 2. In general, after the reception (10) of a request, coming from a requesting application (AppReq), for a resource (ReqRes) (for example the cryptographic material, other components), the operating system (SYST) (or loading system)):

obtains (100) at least one address ($Adr_1, Adr_2, \ldots, Adr_N$) corresponding to at least one block of data ($DBloc_1$, $DBloc_2, \ldots, DBloc_N$) within which the resource is present; and for each of the previously obtained addresses ($Adr_1$, $Adr_2, \ldots, Adr_N$):
  loads (110) a block of current data ($DBloc_i$) corresponding to a current address ($Adr_i$);
  obtains (120) at least one reference certificate ($CertR_i$) of the current block of data ($DBloc_i$);
  obtains (130) at least one current certificate ($CertC_i$) of the current block of data ($DBloc_i$);
  issues (140) an assertion of validity ($Arv_i$) as a function of said reference certificate ($CertR_i$) and of the current certificate ($CertC_i$).

When a current certificate does not correspond to a reference certificate for a given address, the assertion of validity is negative. The loaded block is thereupon rejected and is not copied out into the random-access memory. This block is therefore not exploited. When the current certificate is equal to the reference certificate, the assertion of validity is positive; the block is copied out into the random-access memory and can be exploited.

When a resource requires the loading of several blocks of data (because the resource is bulkier than the volume of one block), it is enough for a single assertion of validity to be negative for all the blocks to be rejected. The resource is thus not loaded into the memory. Two cases can then occur: either the calling entity (i.e. the application or the loading system) is able to manage the absence of the requested resource and the execution continues normally; or the calling entity is unable to manage the absence of the resource and the execution ends with an exception leading to the stoppage of the calling entity (stoppage of the application or stoppage of the system).

According to one specific embodiment, when an assertion is negative for a current block, the current block is again reloaded, i.e. the pieces of data corresponding to this block are read a second time. A new certificate is then computed on the data read for a second time. When the assertion is again negative, the current block is definitively rejected. Such a technique of dual verification makes it possible guard against faulty reading caused, for example, by a deterioration of the physical memory.

Thus, this technique makes it possible to check only the payload data and not all the information stored in the physical support. Thus, a major gain in time is obtained for example when accessing a protected resource (data recorded in a protected memory) or else during a complete loading of the system (for example during a booting of the terminal). The authentication is done only on the resource (application or data) needed for the operation. Thus, the resources are checked only as and when they are used and not in their totality in one and the same operation.

Specific embodiments of the present technique are described here below. They present several ways of loading resources on demand as a function of the way in which the reference certificate is recorded. These different embodiments make it possible to respond to problems of access to different resources or storage points.

6.2. Description of One Embodiment

In this embodiment, the above-described technique is implemented to accelerate the booting of a payment terminal. For all practical purposes, it may be recalled that a payment terminal takes the form of a device comprising a casing and at least one electronic card called a motherboard. A payment terminal also comprises a secured processor and a secured memory. This secured processor and this secured memory are disposed within a secured enclosure in the terminal. The payment terminal also comprises a keypad (it is generally a keypad comprising physical keys) and a screen. The keypad is often used to carry out operations of entry (by the merchant, for example to enter an amount to be paid by the user and by the user for example to enter a bankcard confidential code). The screen is used to display data, the data being for example data enabling interaction with the merchant or the user. Mechanisms are implanted to ensure exclusive control of the screen and of the keypad during the payment operations.

The payment terminal also optionally comprises a non-secured processor, sometimes called a multimedia processor or an applications processor, and an equally non-secured memory used by this applications processor. The applications processor is generally in charge of the execution of applications related to payment functions. Thus, the applications processor can for example be in charge of executing applications known as loyalty applications or again advertising applications.

In order to function, the payment terminal has a software program called an operating system. When the terminal is booted, the operating system is generally loaded from the mass memory in which it is recorded. Besides, in most cases, the operating system used is a Linux-type system. Such a type of system is well suited to implementing the present technique: indeed, on Linux-type systems, all the executable files of the system are totally loaded into the random-access memory at the time of booting. The authenticity of all the executable files is verified before these files are loaded into the random-access memory and this is done for the totality of the executable file and its data, thus slowing down the booting of the apparatus. Indeed, owing to the critical nature of the operations conducted by the payment terminal, it is necessary to verify this authenticity when booting the apparatus. This requirement comes especially from standards and specifications applied by the manufacturers of the terminals. Compliance with these standards results in certification which is often indispensable to selling these payment terminals to clients.

Figure 3:
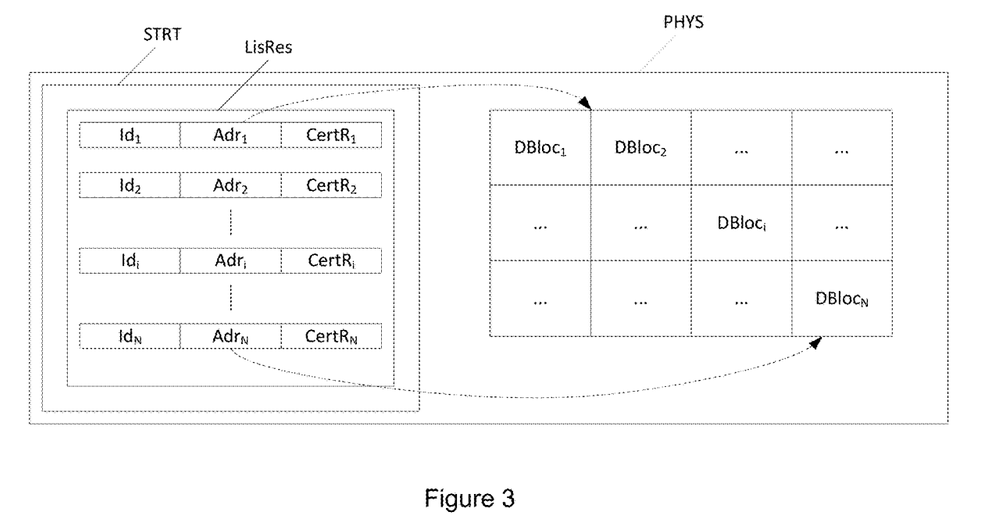
FIG. 3 describes a first embodiment of the technique of storage and loading in which the list of resources comprises a reference certificate for each block of data.
Figure 4:
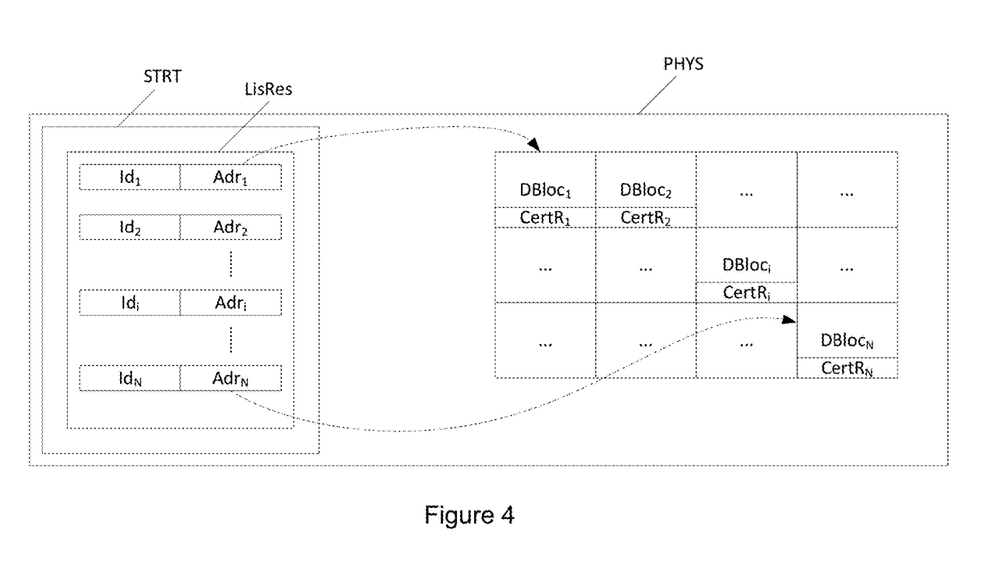
FIG. 4 describes a second embodiment of the technique of storage and loading in which each block of data is followed by a reference certificate.

To be able to reduce the booting time for the terminal, the invention therefore in the present embodiment uses a bootloader (a loading program) which implements the present technique. This bootloader conventionally loads the resources into the random-access memory. FIGS. 3 and 4 illustrate the following description according to two embodiments.

To operate as required, the bootloader has a list of resources to be loaded (LisRes). This list of resources is registered within (or is accessible from) a booting sector (STRT) with a physical volume (PHYS) of a mass memory of the payment terminal. More particularly, this list (LisRes) is recorded in a secured (and possibly encrypted) way: it contains the resources to be loaded, the order of loading of these resources; for each of these resources, the list comprises at least one location address ($Adr_1$, $Adr_2$, etc.) (on the physical volume) corresponding to a block of data ($DBloc_1$, $DBloc_2$, etc.). Depending on the size of the resource, several block addresses can be necessary.

Besides, for each block, a reference certificate ($CertR_i$) can be present within the list of these resources (LisRes). A reference certificate typically takes the form of a digital signature. This digital signature is obtained as follows: the data corresponding to the block are hashed (with a hash function which can be known per se), thus delivering an imprint and an encryption is applied to this imprint which delivers an encrypted digital signature (or certificate).

As an alternative, it is possible not to have a reference certificate ($CertR_i$) available for each block of data in the list of resources (LisRes). In this case, the blocks of data are signed digitally and contain their own signatures as illustrated in FIG. 4. Each block of data takes the form of a set of data comprising, firstly, resource data and secondly a digital signature ($CertR_i$) of this resource data. This digital signature is the result of:
  a hash function applied to the block data, delivering a hashed value;
  an encryption function with a private key of this hashed value.

The first case shown in FIG. 3, in which the reference certificate ($CertR_i$) is associated with each block in the list of resources (LisRes), has one advantage in terms of security because the certificate is directly available. However, this embodiment requires more space in the booting sector, and this can raise problems in certain hardware configurations where this space is limited.

The alternative, shown in FIG. 4, has the advantage of not requiring too much space in at the booting sector. The data of the blocks are signed digitally in advance and integrated into the block when it is being written (during the manufacture of the terminal or when it is being parametrized). By contrast, this solution could be slightly less secure: it is possible that a hacker who knows the private key used to encrypt the hash values can both replace the data of the block and replace the certificate of this same block, and do so in manipulating only one location on the physical support.

Figure 5:
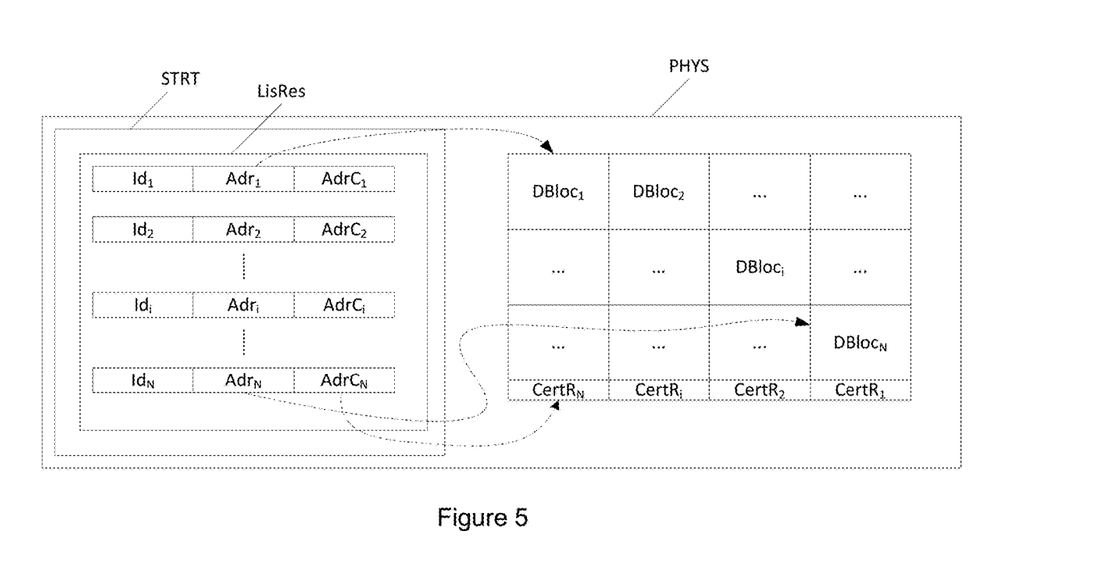
FIG. 5 describes a third embodiment of the technique of storage and loading in which the certificates are all recorded at a pooled location, for all the certificates, in a random or semi-random order; the list of resources comprises both the address of the block of data and the address of the certificate.

This is why a second alternative can be envisaged, as described in FIG. 5. In this second alternative, the list of resources (LisRes) comprises a location address of each block as in the first and second cases. In addition, for each block the list of resources (LisRes) contains an address of location of the certificate. The loading module loads the data of the block at the address indicated for this data and loads the certificate corresponding to this data of the block at the address indicated for this certificate. In a complementary way, the certificates are disposed on the physical support at addresses that do not necessarily correspond to the order of the blocks. This is done to prevent the certificate from being discovered iteratively. The positioning of the certificates on the physical support is therefore done in a random or pseudo-random order in a predetermined positioning zone. With this second alternative, the problems of the first two embodiments are resolved. This third case is naturally interesting only when the length of the addresses where the certificates are recorded is smaller than the size of the certificate itself. If this is not the case (i.e. if the size of the certificate is smaller than or equal to the size of the address), the first embodiment remains the most interesting embodiment.

Whatever the alternative chosen, the loading manager carries out a loading of the resources in the order indicated in the list of resources in loading the blocks corresponding to these resources and in verifying the authenticity of these blocks (issuing an assertion of authenticity). When a block is not authentic, it is not copied into the random-access memory. In one secured loading mode, the loading is stopped as soon as an assertion of authenticity is negative.

Specifically, each block is read independently: the block in question is input, by the loading module, into a checking module. The checking module carries out a certain number of computations on the basis of the received block. The checking module also inputs a block number or a block address. The number (or address) serves to obtain reference data in the list. This reference data can be a reference certificate (a certificate corresponding to the hash value of the data of the block to which a cryptographic function with public or private key is applied): in this case, the certificate is a digital signature. As explained here above, the reference certificate can be directly integrated into the list. In this case, the verification certificate carries out a similar cryptographic computation on the data of the block: it computes a hash value on the data of the current block and applies a cryptographic function with public or private key to this hash value. The module thus obtains a current certificate and compares this current certificate with the reference certificate. If the two certificates correspond, the assertion of validity is possible. If not, the assertion of validity is negative and the loading is interrupted. The advantage of this embodiment is that it does not reduce the storage space of each block of data.

In the first alternative, the block of data that has passed into the checking module already has its own precomputed digital signature (precomputed in the factory for example, during the installation of the software or during a parameterizing operation). It is therefore not necessary to carry out this computation. The digital signature is extracted from the data and decrypted: then a decrypted hash value is obtained (this is the reference certificate). Then, the verification module carries out a hash computation on the current data of the block (this is therefore the current certificate). If the two values correspond, the assertion of positive validity is issued. If not, an assertion of negative value is issued. The advantage of this embodiment is that there is no need for a reference certificates pre-recorded in the list. This makes it possible to have more storage space available in this booting sector.

In the second alternative, the verification module retrieves the certificate through its address, given in the list, and carries out computations similar or identical to those done previously, in order to issue the assertions of authenticity.

6.3. Other Features and Advantages

Figure 6:
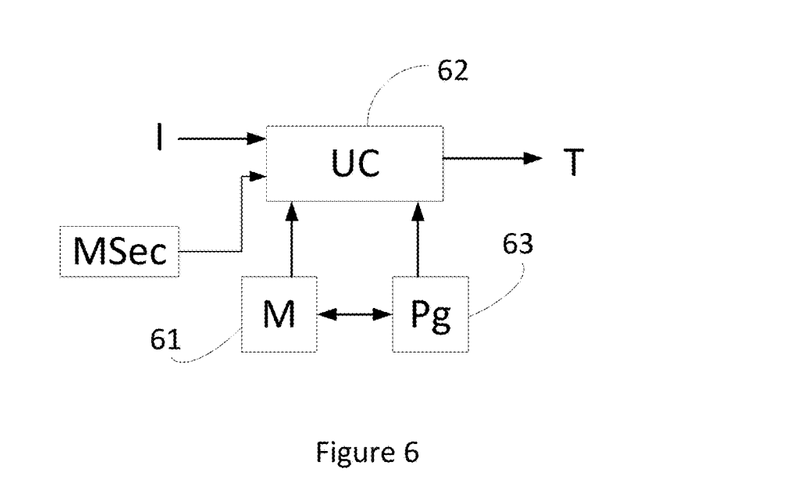
FIG. 6 describes a device such as a payment terminal capable of implementing a resource according to the present technique.

Referring to FIG. 6, a device such as a payment device or a smartphone is described. Such a device is configured to implement a loading of resources according to the technique described here above.

For example, the device comprises a memory 61 constituted by a buffer memory, a processing unit 62, equipped for example with a microprocessor and driven by the computer program 63 implementing a method for loading resources.

At initialization, the code instructions of the computer program 63 are for example loaded into a memory and then executed by the processor of the processing unit 62. The processing unit 62 inputs at least one piece of data representing an identifier of resources to be loaded. The microprocessor of the processing unit 62 implements the steps of the method for loading resources according to the instructions of the computer program 63 to copy the content of one or more blocks of data recorded on a physical support into a random-access memory in making a block-by-block verification of the authenticity of these blocks in order to load, at a given point in time, only those blocks the use of which is required in relation to the requested resource.

To this end, the device comprises, in addition to the buffer memory 61, communications means, data transmission means and possibly an encryption processor. When an encryption processor is implemented, it is advantageously a secured processor having access to a secured memory (Msec) within which a list of resources is recorded. This list of resources is accessible to the encryption processor in order to enable a comparison of a reference certificate and a current certificate, the reference certificate being recorded at the time of initialization or parameterization of the device. To this end, the processor comprises unique identification means. The unique identification means ensure the authenticity of the processor.

Besides, the device furthermore comprises an electronic certificate enabling the management and interruption of the requests for access to resources so that the requests are processed only when the resources in question have been verified according to the above-described method of management.

The invention claimed is:

1. A method for loading an information-processing resource by a device comprising a processor and a random-access memory, said loading being done into said random-access memory of said device from a mass memory, said resource being recorded in said mass memory by using at least one block of data, wherein said method comprises:
obtaining, within a list of resources, at least one current address corresponding to at least one block of data within which the resource is at least partially recorded; and for said at least one previously obtained current address:
loading a current block of data as a function of said current address;
obtaining at least one reference certificate of the current block of data, said reference certificate being an encrypted digital signature of said current block of data;
obtaining at least one current certificate of the current block of data, said current certificate being an encrypted digital signature of said current block of data;
issuing an assertion of validity as a function of said reference certificate and said current certificate when said reference certificate and said current certificate are identical;
copying said current block of data into the random-access memory of said device, when said assertion of validity is positive,
wherein said obtaining at least one reference certificate of the current block of data comprises loading said reference certificate from an address of said reference certificate, said address of said reference certificate being obtained from the list of resources, of which at least one input is associated with said current address and said address of said reference certificate.

2. The method for loading according to claim 1, wherein said obtaining said at least one address comprises:
intercepting a request for obtaining said resource;
determining said at least one address of said resource as a function of the list of resources.

3. The method according to claim 2, wherein said list of resources is recorded in a secured memory of said device.

4. An electronic device for loading a computer resource into the electronic device, the electronic device comprising:
a processor;
a non-transitory computer-readable medium comprising instructions stored thereon which when executed by the processor configure the electronic device to perform the loading; and
a random-access memory, said loading being done within said random-access memory of said electronic device from a mass memory, said resource being recorded in said mass memory by at least one block of data,
wherein the loading comprises the following acts performed by the electronic device:
obtaining, within a list of resources, at least one current address corresponding to at least one block of data within which the resource is at least partially recorded;
loading a current block of data as a function of said current address;
obtaining at least one reference certificate from the current block of data, said reference certificate being an encrypted digital signature of said current block of data;
obtaining at least one current certificate of the current block of data, said current certificate being an encrypted digital signature of said current block of data;
issuing an assertion of validity as a function of said reference certificate when said reference certificate and said current certificate are identical;
copying said current block of data into the random-access memory of said device,
wherein said obtaining at least one reference certificate of the current block of data comprises loading said reference certificate from an address of said reference certificate, said address of said reference certificate being obtained from the list of resources, of which at least one input is associated with said current address and said address of said reference certificate.

5. A non-transitory computer-readable medium comprising a computer program product stored thereon including program code instructions for identifying a user for loading a computer resource into a device comprising a processor and a random-access memory, said loading being done within said random-access memory of said device from a mass memory, said resource being recorded in said mass memory by at least one block of data when the instructions are executed on a processor of an electronic device, the program code instructions comprising:

obtaining, within a list of resources, at least one current address corresponding to at least one block of data within which the resource is at least partially recorded; and for said at least one previously obtained current address:

loading a current block of data as a function of said current address;

obtaining at least one reference certificate of the current block of data, said reference certificate being an encrypted digital signature of said current block of data;

obtaining at least one current certificate of the current block of data, said current certificate being an encrypted digital signature of said current block of data;

issuing an assertion of validity as a function of said reference certificate and said current certificate when said reference certificate and said current certificate are identical;

copying said current block of data into the random-access memory of said device, when said assertion of validity is positive, wherein said obtaining at least one reference certificate of the current block of data comprises loading said reference certificate from an address of said reference certificate, said address of said reference certificate being obtained from the list of resources, of which at least one input is associated with said current address and said address of said reference certificate.

* * * * *